United States Patent
Nakao et al.

(10) Patent No.: US 6,774,963 B1
(45) Date of Patent: Aug. 10, 2004

(54) LIQUID-CRYSTAL DISPLAY DEVICE

(75) Inventors: Kenji Nakao, Osaka (JP); Katsuhiko Kumagawa, Neyagawa (JP); Tsuyoshi Uemura, Kadoma (JP); Naohide Wakita, Suita (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/958,658

(22) PCT Filed: Apr. 12, 2000

(86) PCT No.: PCT/JP00/02396

§ 371 (c)(1),
(2), (4) Date: Oct. 12, 2001

(87) PCT Pub. No.: WO00/62120

PCT Pub. Date: Oct. 19, 2000

(30) Foreign Application Priority Data

Apr. 13, 1999  (JP) ............................................ 11/105183

(51) Int. Cl.[7] ............................................ G02F 1/1335
(52) U.S. Cl. .......................... 349/104; 349/105; 349/80; 349/108; 349/106
(58) Field of Search ................................. 349/104, 105, 349/80, 108, 106

(56) References Cited

U.S. PATENT DOCUMENTS

| | | | | |
|---|---|---|---|---|
| 4,560,241 A | * | 12/1985 | Stolov et al. ................... | 349/97 |
| 5,019,808 A | * | 5/1991 | Prince et al. .................. | 345/88 |
| 5,029,986 A | | 7/1991 | De Vaan ....................... | 350/338 |
| 5,267,060 A | * | 11/1993 | Colton .......................... | 359/15 |
| 5,499,126 A | * | 3/1996 | Abileah et al. .............. | 349/106 |
| 5,721,600 A | * | 2/1998 | Sumiyoshi et al. .......... | 349/119 |
| 5,734,457 A | * | 3/1998 | Mitsui et al. ................ | 349/106 |
| 5,739,889 A | * | 4/1998 | Yamada et al. .............. | 349/156 |
| 5,822,029 A | * | 10/1998 | Davis et al. ................. | 349/115 |
| 5,841,494 A | * | 11/1998 | Hall .............................. | 349/98 |
| 6,181,399 B1 | * | 1/2001 | Odoi et al. .................. | 349/113 |
| 6,295,109 B1 | * | 9/2001 | Kubo et al. ................. | 349/119 |
| 6,330,100 B2 | * | 12/2001 | Van Aerle et al. .......... | 359/254 |
| 6,339,464 B1 | * | 1/2002 | Anderson et al. ........... | 349/187 |
| 6,359,668 B1 | * | 3/2002 | Iijima et al. ................... | 349/61 |
| 6,501,521 B2 | * | 12/2002 | Matsushita et al. ......... | 349/106 |
| 6,580,484 B2 | * | 6/2003 | Okamoto et al. ............ | 349/119 |
| 6,587,168 B2 | * | 7/2003 | Jones et al. .................... | 349/96 |

FOREIGN PATENT DOCUMENTS

| | | |
|---|---|---|
| JP | 63-043123 | 2/1988 |
| JP | 02-149881 | 6/1990 |
| JP | 05-323307 | 12/1993 |
| JP | 09-258207 | 10/1997 |
| JP | 10-197859 | 7/1998 |
| JP | 11-038397 | 2/1999 |
| JP | 11-160694 | 6/1999 |

* cited by examiner

*Primary Examiner*—Jerome Jackson
*Assistant Examiner*—Eugene Lee
(74) *Attorney, Agent, or Firm*—Parkhurst & Wendel, L.L.P.

(57) ABSTRACT

A liquid crystal display device having a back side light source, which can perform displays of both a transmissive type and a reflective type, employs interference filters formed with a multilayer film 18, 19 and 20 as color filters to be used for color display. The back side light source is switched off in use as a reflective type display. The display in the liquid crystal display device can be inverted to a negative. The normal direction of the multilayer film of the interference filter may differ from the normal direction of a substrate.

20 Claims, 11 Drawing Sheets

FIG. 10
(a)
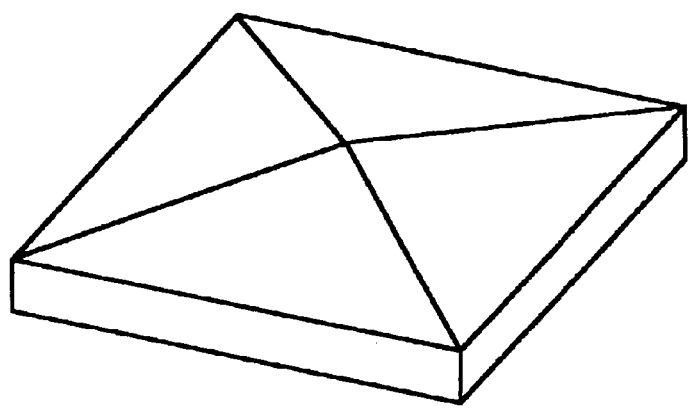
(b)
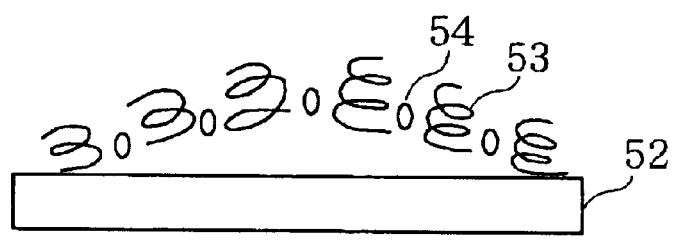

FIG. 11
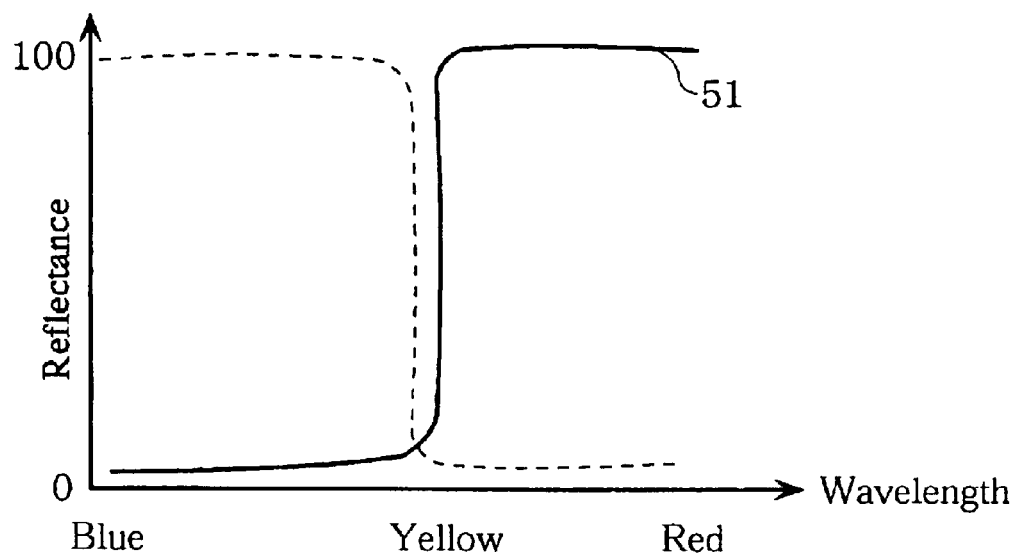
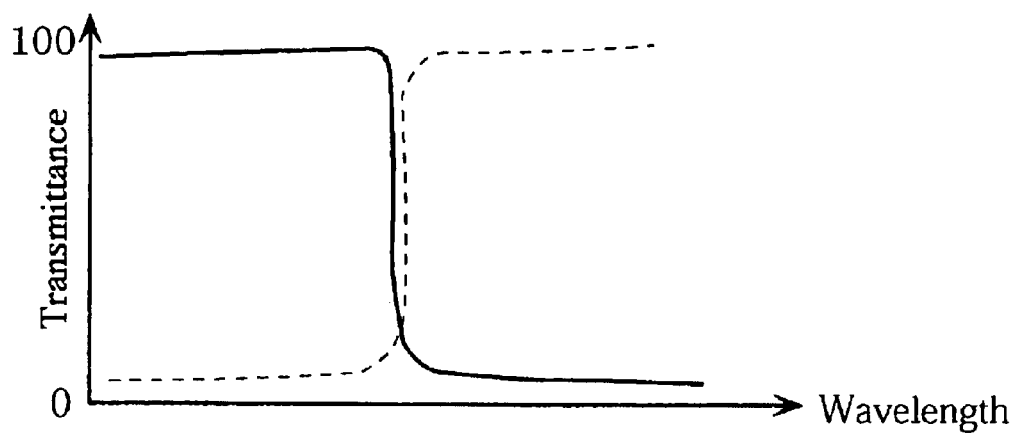

LIQUID-CRYSTAL DISPLAY DEVICE

TECHNICAL FIELD

The present invention relates to color filters and liquid crystal display devices (or display elements, display units). More particularly, the invention relates to color filters and liquid crystal display devices which are used for portable data terminals or the like and further relates to color filters and liquid crystal display devices of types usable for both transmission and reflection.

BACKGROUND OF THE INVENTION

General Background Art

Liquid crystal display devices are roughly divided into transmissive type and reflective type devices.

First, with regard to transmissive type devices, commonly used transmissive type color liquid crystal display devices employ absorption type color filters. The transmissive type color liquid crystal display device has a structure as shown in FIG. 1. In the figure, the reference numeral 11 denotes a light guide plate provided with a reflection plate (not shown in the figure) on its lower side or the like. The reference numeral 12 denotes a polarizer. The reference numeral 14 denotes a back (lower) side substrate. The reference numeral 15 denotes a front (upper; viewers operate and watch the display screen there) side substrate. The reference numeral 17 denotes a polarizer on the front side. The reference numeral 61 denotes an absorption type color filter for transmitting red light (absorbing light of wavelengths other than red). The reference numeral 62 denotes an absorption type color filter for transmitting green light. The reference numeral 63 denotes an absorption type color filter for transmitting blue light. The reference numeral 21 denotes a light source as a sidelight or a backlight.

Basic function, structure, material and the like of each of these portions are so-called well-known arts; therefore general descriptions thereof are not provided herein.

Actually, in addition to the above, TFT (Thin Film Transistor) for pixels and for driving pixels is formed on either of the upper and lower substrates, and transparent conductive film and alignment film are disposed on the sides on which those substrates face a liquid crystal layer. The TFT, the transparent conductive film and the alignment film also are so-called well-known arts and additionally are not directly related to the scope of the present invention; therefore illustrations and descriptions thereof are not provided herein.

Only contents, functions and the like which are directly related to the scope of the present invention are described below in principle.

The backlight disposed on the back side of a liquid crystal panel is a so-called white light source (which comprises light of any wavelength so as not to make light of particular colors observable).

Each pixel is provided with an absorption type color filter which transmits only predetermined light corresponding to a color of the pixel and absorbs light other than the predetermined light. Thus, each color of red, green and blue is displayed.

The use of the absorption type color filter, however, causes an extremely great loss of light due to the absorption of approximately two-thirds (or more in some cases) of the light. Accordingly, it has been proposed that an interference filter should be substituted for the absorption type color filter (for example, Japanese Unexamined Patent Publications No. 11-38397, No. 10-197859 and Japanese Patent Application No. 9-273042). An interference filter transmits light of particular colors and reflects light other than the light of particular colors, in other words, reflects light of unnecessary colors for the pixel on the side of the light source. This reflected light thereby is reflected again in a display surface by a reflection plate or the like on the lower side of the light guide plate 11 to be reused for display, resulting in the improvement of utilization efficiency of light as well as the decrease of power consumption and the improvement of luminance.

An example such that an interference filter is applied to a reflective type liquid crystal element is disclosed in Japanese Unexamined Patent Publication No. 11-38397, a model such that an interference filter is formed under a color filter is disclosed in Japanese Unexamined Patent Publication No. 10-197859, and an example of a backlight for color separation using an interference filter is disclosed in Japanese Patent Application No. 9-273042.

An interference filter is generally formed with a multi-layer film, while a type such that an interference filter is formed by curing cholesteric liquid crystal has been proposed in recent years (for further details, refer to 'the development of color filters by using cholesteric liquid crystal presented by Tokuhisa MORIYA in DAI NIPPON PRINTING CO., LTD. at the 6th research report meeting of HLC°).

Next, with regard to reflective type devices, commonly used reflective type color liquid crystal display devices also employ absorption type reflection plates. The reflective type color liquid crystal display device has a structure shown in FIG. 2 such that a reflection plate 71 which reflects only predetermined light and absorbs light other than the predetermined light is formed on a substrate on the back side of a liquid crystal panel. Thus, only pixels for brightly displaying predetermined light reflect the predetermined light; the reflection plate reflects the predetermined light on the display side (the side of viewers);.and only the pixels for brightly displaying predetermined light absorb the predetermined light, while a circular light plate and a liquid crystal layer shut off (absorb) the predetermined light in the case of pixels for not brightly displaying predetermined light. In FIG. 2, corresponding numbers are given to members and portions having the same function, structure and the like as in FIG. 1. Similarly, these numbers apply to liquid crystal display devices according to embodiments of the present invention described after. The reference numeral 71 in FIG. 2 is a reflection plate as well as an electrode.

It is noted for confirmation that transmitted light in this type passes back and forth through a liquid crystal layer, namely, passes through twice for display (this is related to embodiments described after).

In addition to the above, partially transmissive type liquid crystal display devices are mentioned as an intermediate type between the transmissive type and the reflective type. This type is such that a half mirror is disposed on the upper or lower side of the back side substrate 14 of the liquid crystal display device shown in FIG. 1 to transmit a certain quantity of light and reflect a certain quantity of light. A liquid crystal display element of this type is used as the transmissive type when an AC power supply can be used and is used as the power-saving reflective type when battery-operated, being widely used particularly for portable data terminals or the like.

Furthermore, a type of device usable as both a transmissive type and a reflective type device was announced in recent years (in a news release by SHARP CORPORATION on Apr. 1, '99). This type of device is an improved conventional partially transmissive type device and is characterized in that a reflection plate is partially formed at every pixel.

Background Art in View of the Problems to be Solved by the Present Invention

Brightness, however, is not sufficiently secured in liquid crystal display elements described above. Since polarized light has, from the start, been utilized in liquid crystal display devices, utilization efficiency of light is reduced to approximately a half in principle even for mere black-and-white display.

In particular, brightness is further reduced in a type of device usable as both a transmissive type and a reflective type device. For example, if, for the sake of simplicity of explanation, transmittance of a half mirror is assumed to be 50%, only 50% of brightness of a backlight is utilized in the case of transmissive type display, while only 50% of reflected light is utilized in the case of reflective type display. Resultingly, utilization efficiency of light is reduced to half in both types of display. This reduction is caused also when a reflection plate is formed at pixels (actually, in use as a transmissive type device employing a backlight, the transmittance will frequently be less than 50% as compared with use as a reflective type device because of having extra possible luminance).

Moreover, an absorption type color filter is used for a color filter so that two-thirds (or more in some cases) of light is not utilized; therefore utilization efficiency of light is reduced to approximately one-sixth in principle for color display. The use of the above-mentioned half mirror can reduce utilization efficiency of light to approximately one-twelfth in the worst case.

In a model such that an interference filter is used as a measure against the reduction, the display screen is observed in such a manner that colors thereon change when viewing from an oblique direction. That is, an interference filter is formed with a multilayer film or the like having periodicity and selectively reflects light of wavelengths corresponding to the thickness thereof. Consequently, the effective thickness of the interference filter is increased when the display screen is viewed from an the oblique direction, leading to a change in wavelengths which are transmitted.

Less power consumption and brighter display, therefore, have been desired in transmissive type devices and reflective type devices as well as particularly a type usable as both of the types and additionally a liquid crystal display device for color display. It has been desired that colors not change with the direction from which the display screen is viewed and that color saturation be improved.

DISCLOSURE OF THE INVENTION

The present invention is intended for solving the above-mentioned problems and employs a nonabsorption type color filter as a color filter.

According to the invention, transmissive type display and reflective type display are performed.

According to the invention, a back side light source such as a backlight and a sidelight can be switched off independently of a pixel unit for use of the device as a reflective type device.

According to the invention, an interference filter is used as the nonabsorption type color filter.

According to the invention, although modulation characteristics of a liquid crystal layer differ between a transmissive type mode and a reflective type mode in accordance with the thickness of the liquid crystal layer through which light passes through (the distance of transmission), either mode offers a bright display and excellent contrast.

According to the invention, a color filter is an interference filter formed with a multilayer film, and additionally the normal direction of the multilayer film differs from the normal direction of a substrate.

More specific descriptions are detailed below.

An aspect of the invention is characterized in that a liquid crystal display device for color display (including a projection display) having a back side light source, such as a backlight or a powerful light source for projecting, employs as a color filter corresponding to a color of each pixel making up part of a delta, a mosaic, a stripe or the like on a display surface (in the case of projection display, strictly speaking a surface as a film used for displaying) not a conventional color filter which absorbs light other than light of predetermined colors by dispersing colorant into transparent resin, but a nonabsorption type color filter which transmits light of predetermined colors and reflects light other than the light of predetermined colors (note that the nonabsorption type color filter is not limited to the display of the three primary colors).

Another aspect of the invention is characterized in that a liquid crystal display device is a combination liquid crystal display device (as described above, including elements and display units of portable apparatuses) capable of switching between a transmissive type display mode and a reflective type display mode by switching a switch.

A further aspect of the invention is characterized in that the quantity of light of a backlight can be shutoff (to zero) for the use as a reflective type device.

A still further aspect of the invention is characterized in that a nonabsorption type color filter is an interference color filter, such as one formed with a multilayer film, that transmits only light of predetermined colors such as red and reflects light of complementary colors thereto.

A still further aspect of the invention is characterized in that color display of red, green and blue is performed in transmissive type display and color display of cyan, magenta and yellow is performed in reflective type display. For this purpose, the device comprises a predetermined switching circuit and the like for such color displays.

A still further aspect of the invention is characterized in that a display can be inverted to a negative by shifting a TFT between ON and OFF in order to perform an optimum display for each of transmissive type display and reflective type display.

A still further aspect of the invention is characterized in that a liquid crystal display device which can switch between a transmissive type display mode and a reflective type display mode comprises reflection means for reflecting incident light entering from the display side or light of a predetermined color by each pixel for white display and color display when the device is used as a reflective type device, and transmission means for transmitting light of white color or light of a predetermined color by each pixel when the device is used as a transmissive type device.

A still further aspect of the invention is characterized in that a voltage signal for modulation in transmissive type display is set to be large in accordance with a type of liquid crystal to be used therefor in order to compensate for the fact that the amount of modulation, change in the polarization angle of light for display by a liquid crystal layer, is less as compared with reflective type display.

A still further aspect of the invention is characterized in that a portion of a cell is thickened in order to thicken the liquid crystal layer of the portion through which light for display passes when the device is used as a transmissive type device.

A still further aspect of the invention is characterized in that a voltage for modulation is raised in order to increase the amount of modulation in use as a transmissive type device and in that a liquid crystal is used which greatly modulates in response to a high voltage.

A still further aspect of the invention is characterized in that reflected light by a reflection means and transmitted light by a transmission means are in a complementary color relationship and that modulation by a liquid crystal layer can be switched by switching display mode.

A still further aspect of the invention is characterized in that a reflection means and a transmission means are non-absorption types and particularly interference filters.

A still further aspect of the invention is characterized in that an interference filter is formed with a multilayer film and that the multilayer film is formed with inclinations on a surface of the multilayer film at each pixel in the horizontal, vertical, or the like directions as viewed by a viewer in order not to cause disorder to color display depending on the viewing angle.

A still further aspect of the invention is characterized in that a cholesteric liquid crystal is used for the multilayer film.

A still further aspect of the invention is characterized in that an interference filter using the cholesteric liquid crystal is a complex comprising a cholesteric liquid crystal and a polymer.

A still further aspect of the invention is characterized in that a liquid crystal display device which is not a type usable as both a transmissive type device and a reflective type device employs a nonabsorption type color filter for full color display, dichroic display, monochromatic display and the like and that the same techniques as in each of the above-mentioned groups of inventions are employed for the nonabsorption type color filter.

BRIEF DESCRIPTIION OF THE DRAWINGS

FIG. 10 is a view conceptually showing an interference filter formed with a multilayer film using cholesteric liquid crystal.

FIG. 11 is a graph showing characteristics of an interference filter for dichroic display.

DETAILED DESCRIPTION OF THE PREFERRED EMBODIMENTS

The present embodiment relates to color liquid crystal display devices.

EMBODIMENT 1

The present embodiment relates to transmissive type color liquid crystal display devices.

Figure 3:
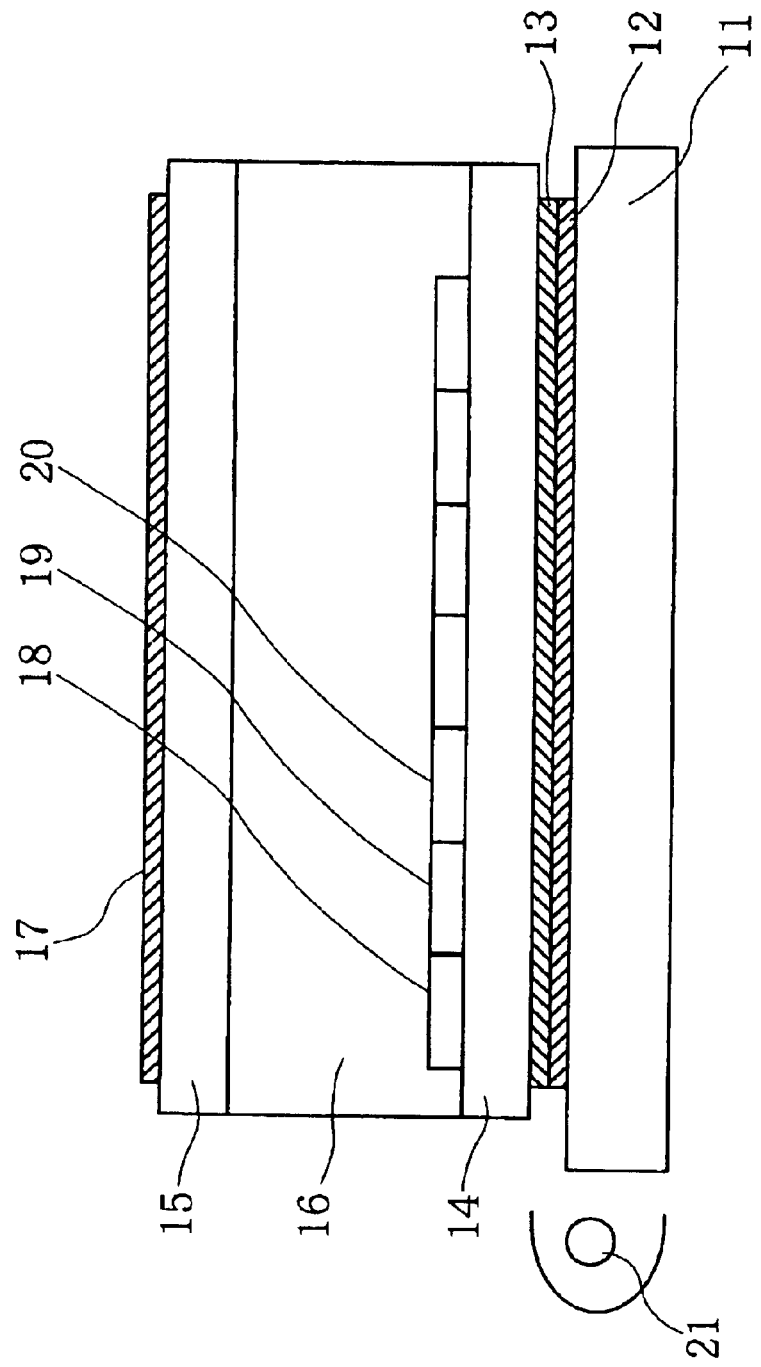
FIG. 3 is a cross sectional view of a structure of a liquid crystal display element according to Embodiment 1 in the present invention.

FIG. 3 shows a cross sectional view of a liquid crystal display element according to the embodiment. In the figure, the reference numeral 13 denotes a retardation plate as a quarter-wave plate ($\lambda/4$). The reference numeral 18 denotes an interference filter for transmitting red light and reflecting cyan light. The reference numeral 19 denotes an interference filter for transmitting green light and reflecting magenta light. The reference numeral 20 denotes an interference filter for transmitting blue light and reflecting yellow light.

These interference filters are detailed in embodiments described after.

Figure 1:
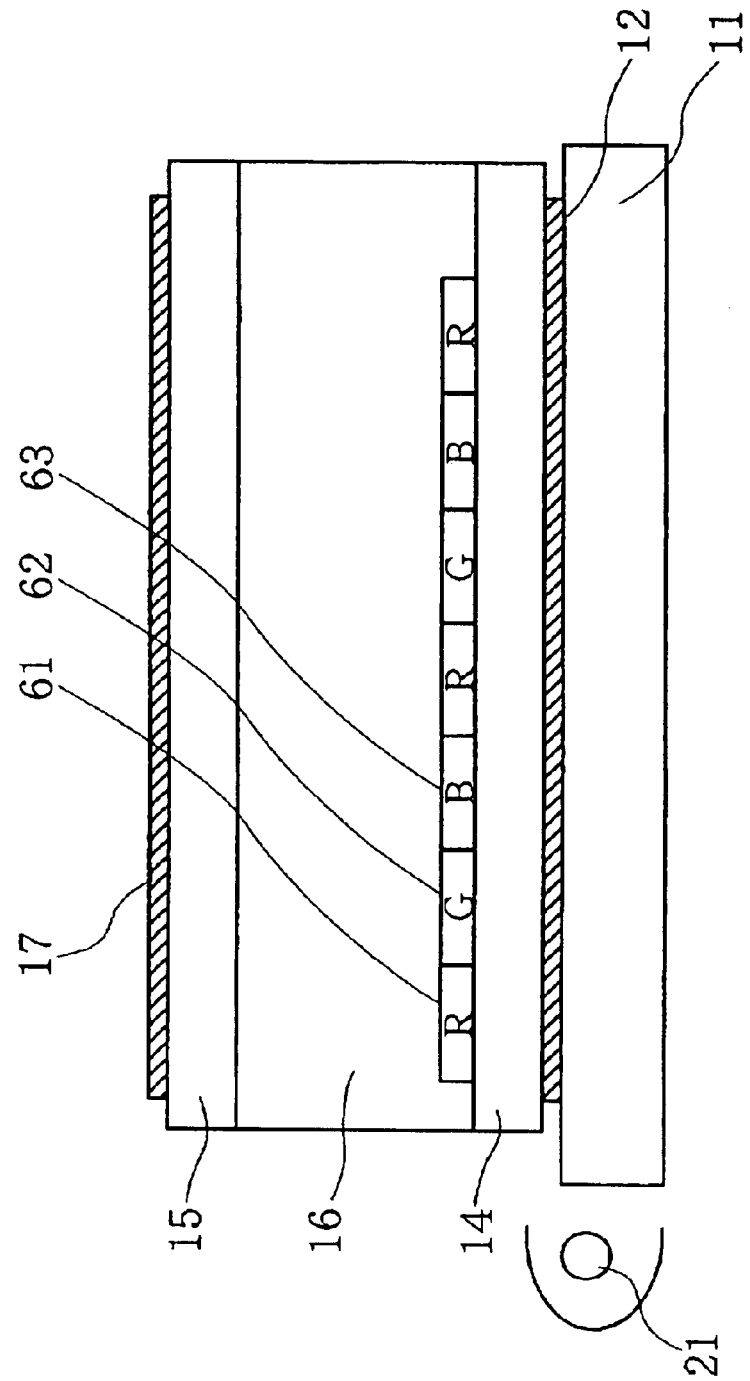
FIG. 1 is a cross sectional view of a structure of a conventional transmissive type liquid crystal display element.
Figure 2:
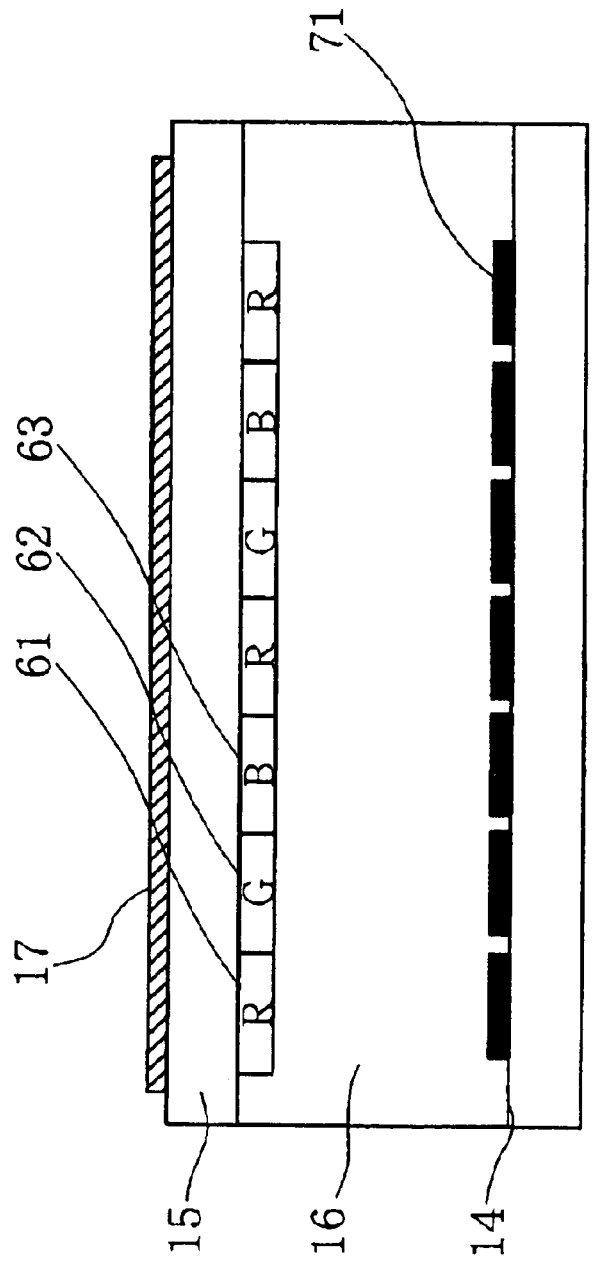
FIG. 2 is a cross sectional view of a structure of a conventional reflective type liquid crystal display element.

A liquid crystal display element according to the embodiment has the same basic structure as in FIG. 1, for example, a backlight unit is disposed on the back side of a liquid crystal panel holding liquid crystal between substrates thereof. The liquid crystal display element, however, differs from FIG. 1 in that the interference filters are formed at each pixel on the back side substrate. Although these color filters are formed on the active matrix substrate on which TFT (Thin Film Transistor) is formed, illustrations of the TFT are not provided herein for the previously mentioned reason.

The interference filters having the above-mentioned characteristics serve as the color filters shown in FIG. 1. Cyan, magenta and yellow are a mixture of green and blue, red and blue, and red and green respectively. It is noted for confirmation that red, green and blue are a complementary color to cyan, magenta and yellow respectively. These descriptions are so-called well-known matters; therefore further detailed descriptions thereof are not provided herein.

A liquid crystal layer to be used has a twisted nematic structure with a twist of 45°. As a result, the liquid crystal layer functions as a quarter-wave plate ($\lambda/4$) with no application of voltage, and meanwhile does not function as a quarter-wave plate ($\lambda/4$) with the application of voltage for the reason that liquid crystal therein is aligned in the direction of electric field. The switching of electric field (ON and OFF, or opening and closing) performs displaying.

A polarizer 17 is adhered to an upper side substrate 15 so that the direction of absorption axis thereof is parallel to the rubbing direction of alignment film. A quarter-wave plate ($\lambda/4$) 13 and a polarizer 12 are adhered to a lower side substrate 11 so that the direction of absorption axis thereof is perpendicular to that of absorption axis of the polarizer on the upper side.

According to this construction, the liquid crystal display element is 'normally black' in transmissive type display and meanwhile is 'normally white' in reflective type display. 'Normally black' is a mode such that 'black display' (light does not reach the display side) is performed with no application of voltage, while 'normally white' is a mode such that 'white display' (light reaches the display side, that is, light corresponding to a color of a pixel to which voltage is not applied reaches the display side in the case of color display; therefore the white display is not limited to a white display in terms of chromatics) is performed with no application of voltage.

Functions of this liquid crystal display element are described below.

Figure 4:
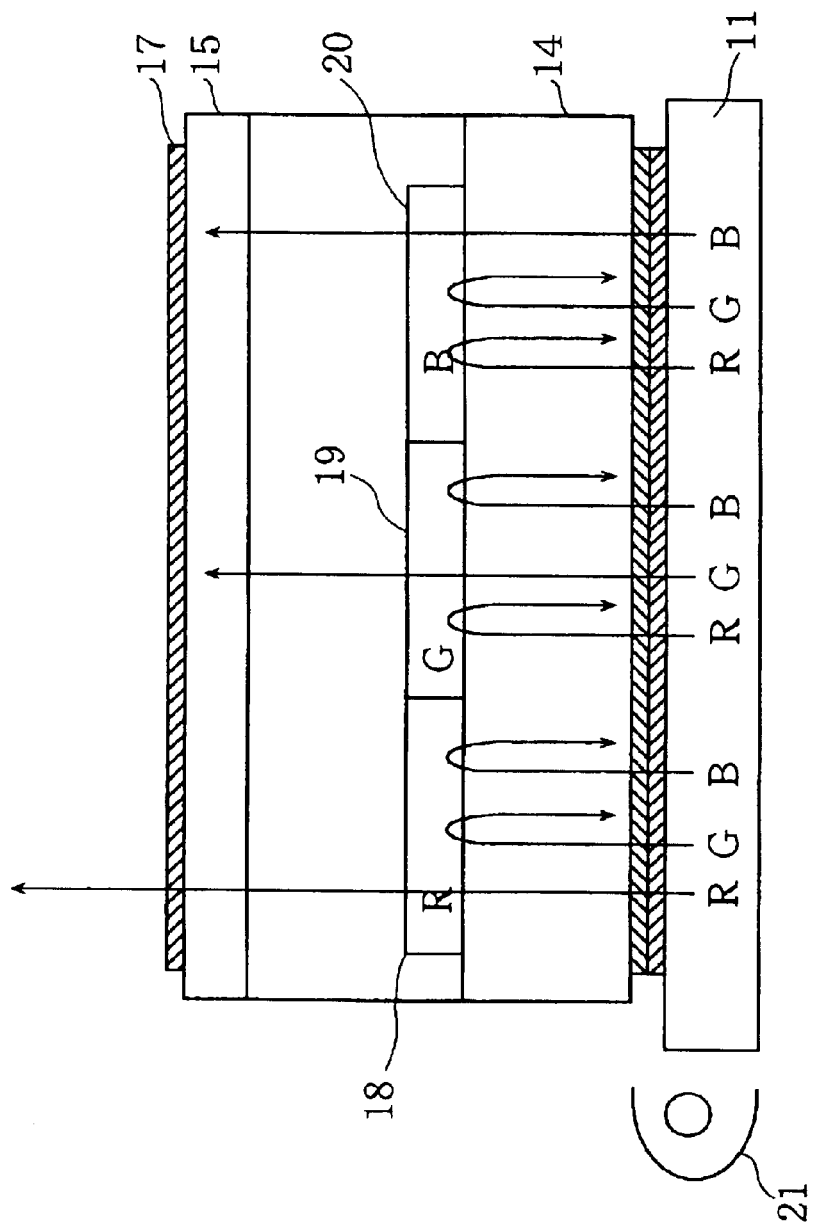
FIG. 4 is a view conceptually showing functions in use of a liquid crystal display element as a transmissive type element according to the above-mentioned Embodiment 1.

FIG. 4 shows functions of transmissive type display, in which a backlight is switched on. In the figure, three kinds of pixels R, G and B are shown and interference filters for not merely transmitting R (red light), G (green light) and B (blue light) but also reflecting light other than red light, green light and blue light are formed as color filters at the pixels R, G and B respectively. Among white light from the backlight, the color filters not only transmit solely light of predetermined colors but also reflect light other than the light of predetermined colors on the side of the backlight. This reflected light thereby is reflected again inside a backlight unit and thereafter reaches the display side through predetermined color filters since it will be rare that there are no pixels of the same color as the reflected light on the whole display surface. Even if this is not the case, the reflected light is utilized directly or indirectly for the rise of temperature of the backlight and the emission of light therefrom, leading to notably less loss of light as compared with absorption type color filters.

The liquid crystal layer in transmissive type display is normally black; therefore only a pixel to which voltage is applied, namely, the pixel R transmits R (red light), for example, when voltage is applied to only the pixel R. G (green light) and B (blue light), meanwhile, are absorbed in the polarizer on the front side. Consequently, the transmission of only R (red light) through the polarizer results in a display of 'red' in color display of R, G and B.

Figure 5:
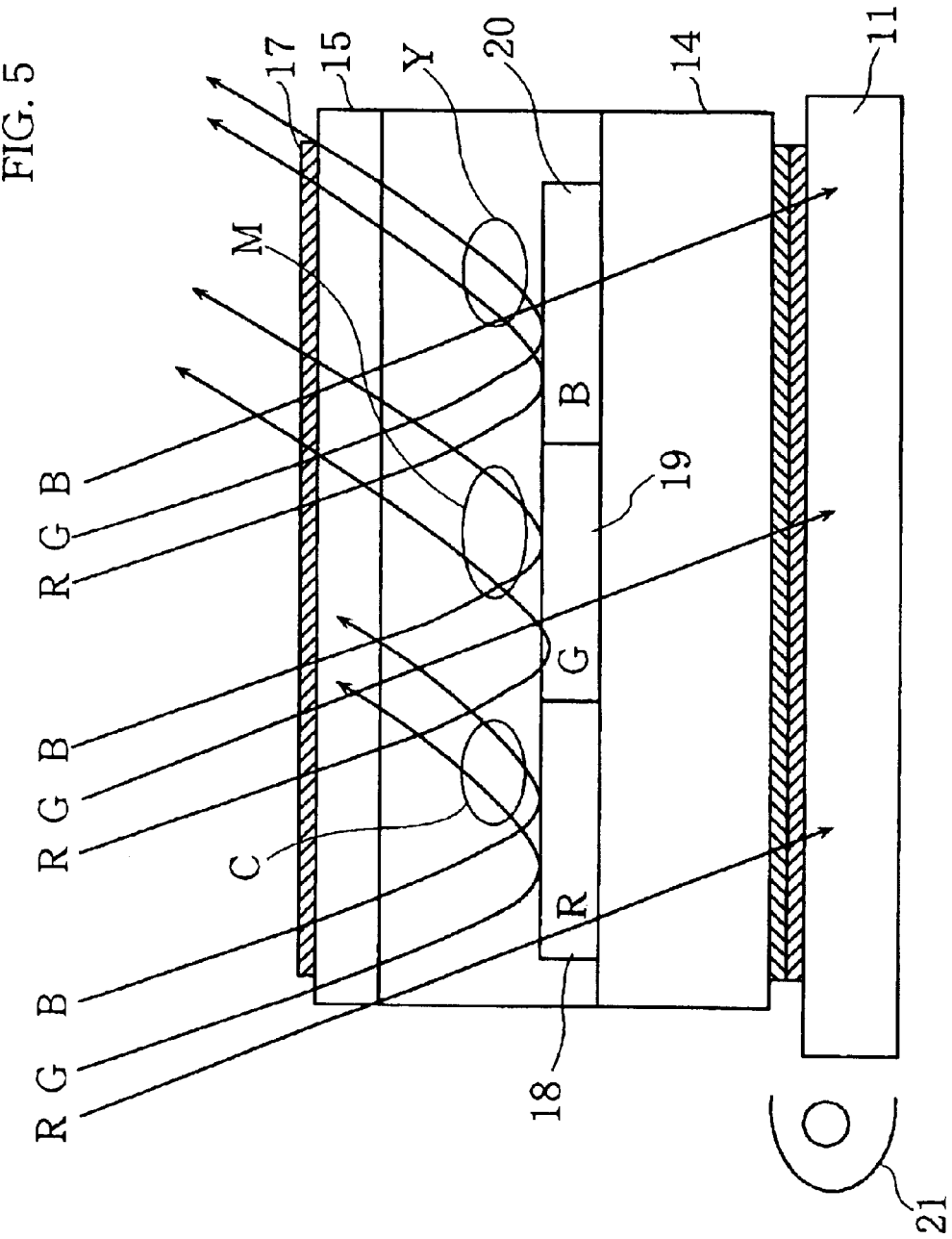
FIG. 5 is a view conceptually showing functions in use of a liquid crystal display element as a reflective type element according to the above-mentioned Embodiment 1.

FIG. 5 shows functions of reflective type display, in which a backlight is switched off, external light such as room light enters from the side of operators, and additionally voltage is applied to only the pixel R.

The external light is white light. Color filters formed at the pixels reflect light of complementary colors to the above-mentioned colors of transmitted light, as the filters are interference filters; therefore in this case the color filter R reflects C (cyan light) which is a mixture of G and B. However, a voltage is applied to the pixel R. At this time because the liquid crystal layer is normally white in use as a reflective type element, pixels to which a voltage is applied become black display. That is, light is absorbed.

At As a result, C (cyan light) reflected thereby is absorbed by the polarizer 17. On the other hand, the interference filters at the pixels G and B reflect M (magenta light: a mixture of R and B) and Y (yellow light: a mixture of R and G) respectively so that M (magenta light) and Y (yellow light) reflected thereby are not absorbed in the normally white reflective type display since voltage is not applied to the pixels G and B. Consequently, in reflective type display the reflection of M (magenta light) and Y (yellow light) results in a display of 'red' in color display of C, M and Y for the reason that each of the pixels G and B is small.

In reflective type display not employing a backlight, because more importance is placed on brightness than on color purity, color display of C, M and Y is desirable. On the contrary, in a transmissive type display employing a backlight, because more importance is place on color purity than brightness, color display of R, G and B is desirable. The liquid crystal display element according to the present embodiment satisfactorily meets the requirements. Actually, the liquid crystal display element was used for both of the types, offering very excellent display.

The liquid crystal display device according to the embodiment is suitable for being applied to mobile apparatuses such as portable data terminals. A backlight thereof can be switched on when there is ample power supply, and meanwhile can be switched off or dimmed when the battery residual quantity is low. More specifically, in accordance with the battery residual quantity, brightness of external light and the like, the voltage of the backlight can be decreased or only one of two backlights can be switched on.

The liquid crystal according to the embodiment is a twisted nematic mode with a twist of 45°. It is to be noted that the liquid crystal is not limited to this mode, in other words, the liquid crystal may be homeotropic liquid crystal, OCB liquid crystal, STN liquid crystal, ferroelectric liquid crystal, ECB liquid crystal or the like.

The behavior itself of the liquid crystal layer according to the embodiment is normally white in reflective type display and meanwhile is normally black in transmissive type display. The reverse of this is also possible, in which case it is necessary to adjust the angle at which a polarizer is adhered and to insert a retardation film according to necessity.

The liquid crystal layer may be normally white in both reflective type and transmissive type display or normally black in both types of display. In these cases, a negative display in reflective type display is opposite to that in transmissive type display; therefore a function should be provided such that display data is inverted to a negative in accordance with conditions of the use.

Figure 6:
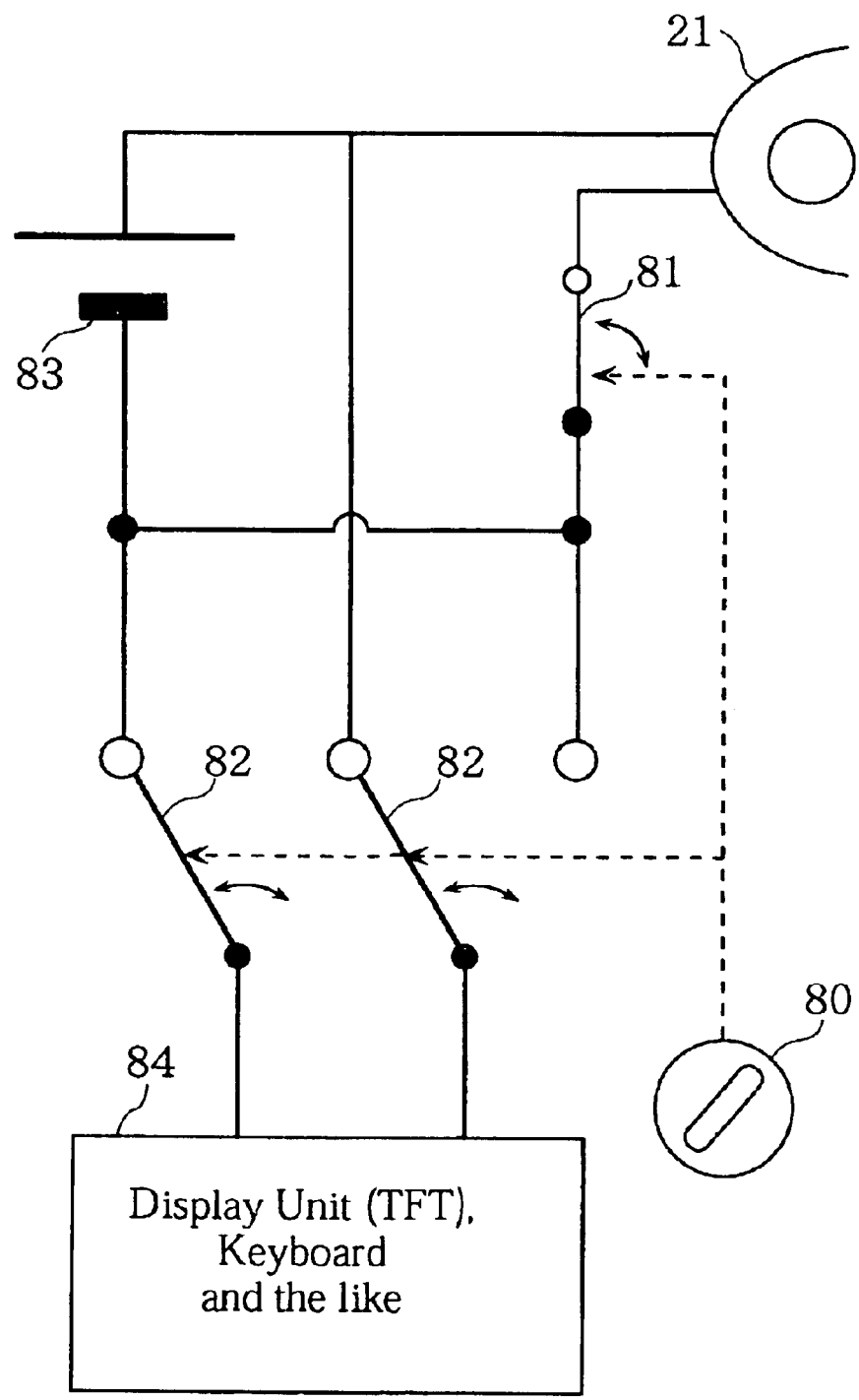
FIG. 6 is a diagram showing principles of a circuit that, for example, switches off a back side light source interlocked to a negative inversion.

A function such that a backlight can be switched off independently of the driving of pixels is provided for the liquid crystal display device according to the embodiment. In the above-mentioned cases, the switching off of the backlight may be interlocked to the driving of pixels. FIG. 6 shows a basic construction of a circuit in these cases. In the figure, the reference numeral 80 denotes a changeover switch. The reference numeral 81 denotes a power switch of a sidelight 21. The reference numerals 82 denote switches for inverting a display mode. The reference numeral 83 denotes a battery as power supply. The reference numeral 84 denotes a power consumption unit not including the sidelight such as a display unit (or TFT thereof), a keyboard and the like. A dotted line is a control signal line. The operation of the changeover switch 80 by an operator performs the above-mentioned action; that is, the driving voltage of the TMTs of the display unit is reversed in accordance with switch-on and switch-off of the sidelight. It is to be noted that FIG. 6 consistently shows principles and therefore differs in some degree from the actual situation.

When pixels are driven by the same mode, as in when reflective type and transmissive type display are constantly displayed by normally white, it is not necessary to provide a system of inversion shown in FIG. 6 or various kinds of regulating apparatuses, not shown in the figure, and the like, naturally facilitating the facilitation of designing a liquid crystal cell. However, as it is usual that external light in reflective type display and light from a backlight in transmissive type element display exist together, the external light and the light from a backlight counteract each other, resulting in a deterioration in contrast. In other words, it is advantageous in terms of contrast to drive each with opposite modes in reflective type display and transmissive type display, while it is advantageous in terms of design to drive each with the same mode.

It is noted in the embodiment that an interference filter exhibits the opposite characteristic (that is, complementary colors) in reflective type display and transmissive type display. Accordingly, polarizers are disposed so that a liquid crystal display element offers the opposite mode to each other in both, leading to a satisfactory performance thereof and thus a liquid crystal display element offering a minimum loss of light and a bright display.

EMBODIMENT 2

Figure 7:
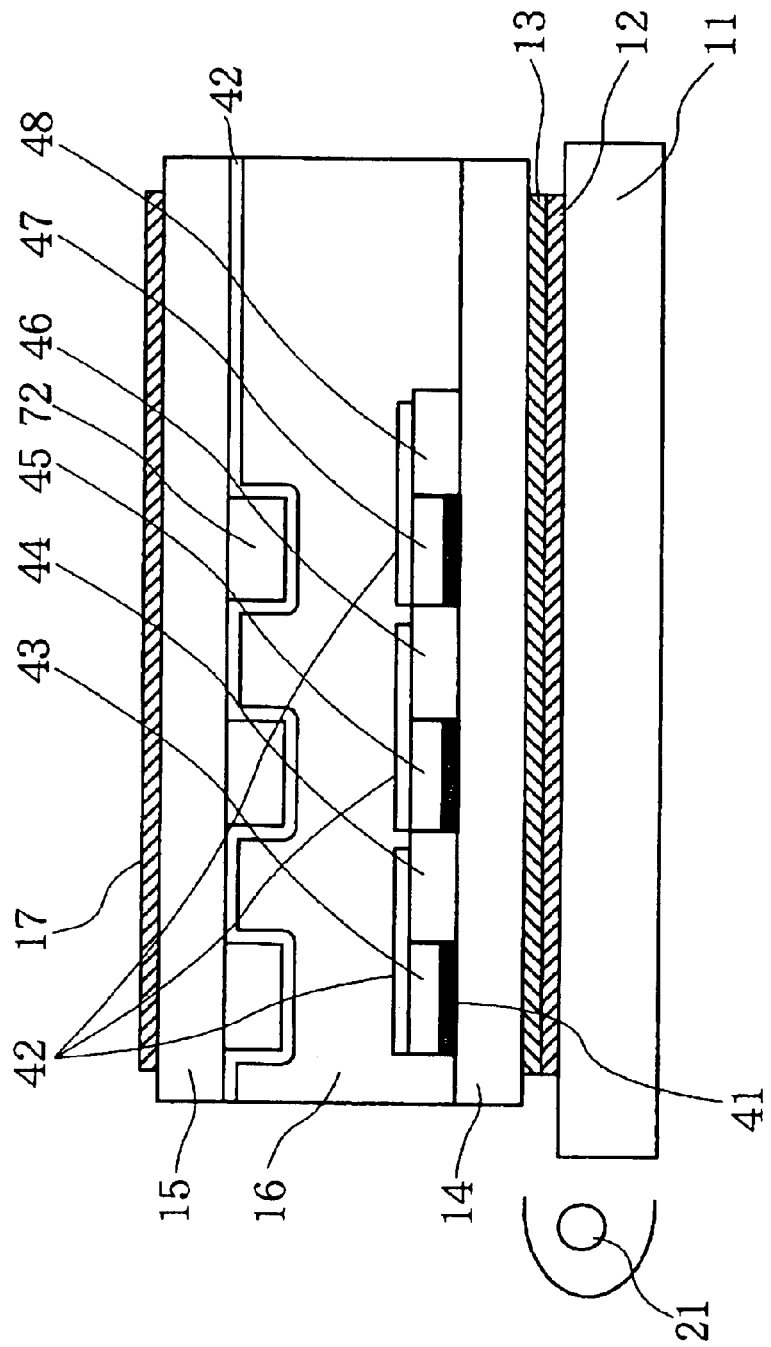
FIG. 7 is a cross sectional view of a structure of a liquid crystal display element according to Embodiment 2 in the present invention.

The present embodiment relates to liquid crystal display elements usable as both transmissive type elements and reflective type elements employing absorption type color filters. FIG. 7 shows a cross sectional view of a liquid crystal display element according to the embodiment. This liquid crystal display element is provided on the back side thereof with a backlight similarly to the above-mentioned Embodiment 1; however, the liquid crystal display element differs in the following points from Embodiment 1.

First, a reflection plate is formed with half an area of each pixel. The reference numeral 41 in the figure denotes the reflection plate with half an area of each pixel formed on a lower side substrate 14 thereof Secondly, absorption type color filters 43 (cyan), 45 (magenta) and 47 (yellow) are formed in respective portions in which the reflection plates 41 are formed. The absorption type color filters are filters which absorb light of color except cyan, magenta and yellow, namely, complementary colors respectively.

Thirdly, portions in which the reflection plates are not formed are transmission portions and absorption type color filters 44 (red), 46 (green) and 48 (blue) are formed therein.

Under the above differences, polarizers 12, 17 and a retardation plate 13 are disposed in the same manner as in the above-mentioned Embodiment 1 so that the liquid crystal display element is normally white in reflective type display and meanwhile normally black in transmissive type display.

The liquid crystal display element such that phase modulation equivalent to a quarter-wave plate (λ/4) is performed was used in the above-mentioned Embodiment 1. In this case, light passes twice through a liquid crystal layer in reflective type display to perform modulation by λ/2 in total, while light passes only once therethrough in transmissive type display to perform modulation only by λ/4. Consequently, if the polarizers are disposed appropriately for reflective type display, a sufficient transmittance in transparent conditions cannot be obtained in transmissive type display; whereas if the retardation plate on the lower side is replaced with a retardation plate having a sufficient transmittance, light is transmitted to some degree in the case of black display.

In Embodiment 2, reflective type portions and transmissive type portions are separately formed and transmissive type cells are made thick. Thus, thicker cells can provide more quantity of phase modulation. Actually, the amount of phase modulation was optimized by setting the cell thickness of reflective type portions to be 2 µm and the cell thickness of transmissive type portions to be 4 µm, leading to an optimal transmittance and an optimal contrast in both transmissive type display and reflective type display.

In order to form these portions with different cell thicknesses, a transparent resin 72 is formed on a substrate on which color filters are not formed in Embodiment 2, and additionally a transparent electrode 42 is formed on the resin. The resin may be formed on a substrate on which color filters are formed. Alternatively, the thickness of color filters may be thickened.

The color liquid crystal display element described in Embodiment 2 may be a black and white type monochromatic type, in which case color filters are not necessary.

The invention according to Embodiment 2 is not limited to a display by phase modulation method. With a display method not depending on phase modulation such as guest host, such change in the cell thickness is not necessary.

EMBODIMENT 3

The present embodiment relates to liquid crystal display elements employing homeotropic liquid crystal for liquid crystal layers. The liquid crystal display element is the same as in the above-mentioned Embodiment 1 except the homeotropic liquid crystal; however, polarizers and a retardation plate are disposed with adjustment thereto.

As described above, brightness is insufficient in transmissive type display according to the above-mentioned Embodiment 1. The homeotropic liquid crystal is liquid crystal which is inclined by the application of voltage to increase the amount of birefringence thereof. More application of voltage, therefore, can increase the amount of birefringence in transmissive type display.

Figure 8:
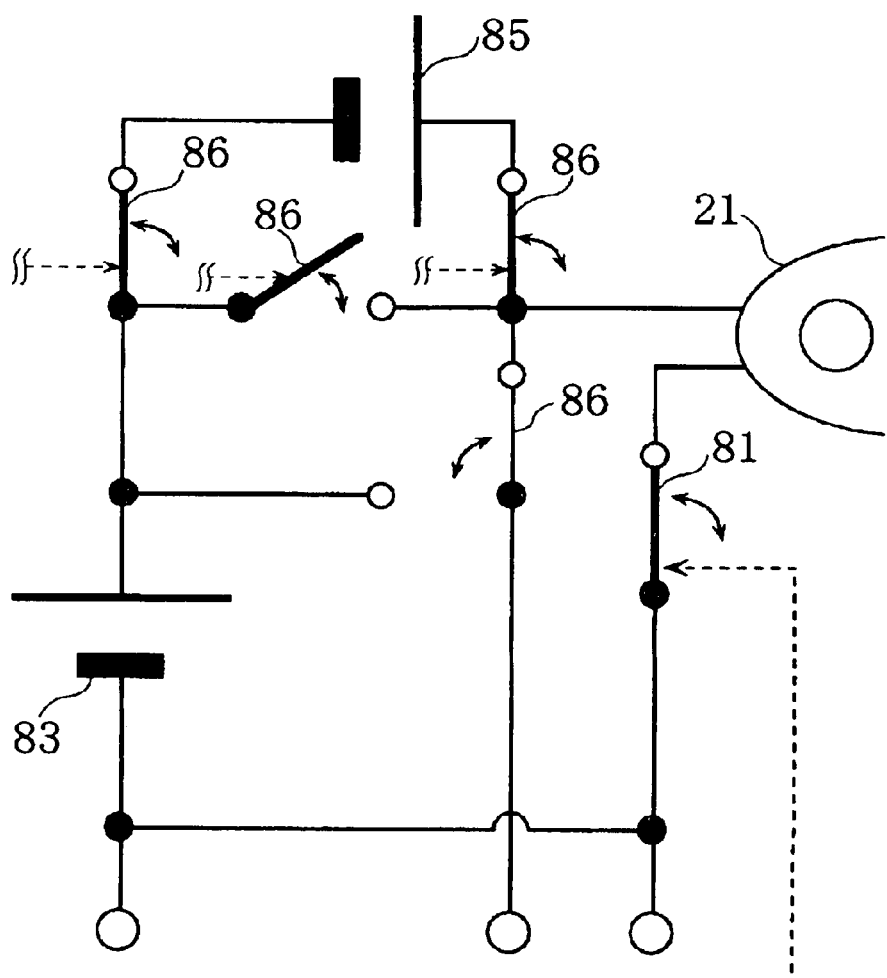
FIG. 8 is a diagram showing a regulating system (circuit) of driving voltage.

The homeotropic liquid crystal according to Embodiment 3 is driven at a comparatively low voltage of 4 V in a mode in which the element is used as a reflective type element. In a mode in which the element is used as a transmissive type element, meanwhile, the homeotropic liquid crystal is driven at a comparatively high voltage of 8 V when there is ample power supply and at a voltage of 4 V when there is not. This changeover is interlocked to a backlight light switch and alternatively may be operated by an operator. A construction of a circuit therefor is simple and basically the same as in FIG. 6 except that the changeover of voltage (between high and low) of power supply is substituted for the switching (ON and OFF) of a sidelight. Accordingly, FIG. 8 shows only portions that differ from FIG. 6. In the figure, the reference numeral 85 denotes an additional battery and the reference numeral 86 denotes a switch of a backlight and a changeover switch of driving voltage of liquid crystal.

Such a circuit enables a bright display and lower power consumption in a reflective type mode, and meanwhile a display with an optimum brightness in a transmissive type mode although power consumption is increased depending on power supply.

The characteristic according to Embodiment 3 is to apply different driving voltages in reflective type display and transmissive type display; therefore it is to be noted that liquid crystal to be used is not limited to the homeotropic liquid crystal. In addition, it is to be noted that power supply is not limited to batteries, for example, that power supply may be commercial power supply although an adapter should be used.

EMBODIMENT 4

The present embodiment relates to interference color filters according to the above-mentioned Embodiment 1. An interference color filter according to Embodiment 4 is intended for solving the change in colors generated by viewing direction by means of forming portions in a pixel with different inclinations.

A method of forming the interference color filter according to Embodiment 4 is described below.

After coating acrylic resin on a glass substrate 52, unevenness 51 is formed on the acrylic resin with a symmetrical inclination. The unevenness is formed by etching or may be formed by pressing. The inclination of this unevenness is bilaterally symmetrical. Although Figure shows only symmetry about a vertical plane, this inclination structure may be formed so as to be symmetrical not only about a vertical plane, but also about a plane orthogonal to the surface of the paper. A shape thereof is also not limited to this structure.

The interference filter of each of R (red), G (green) and B (blue) formed with a multilayer film is formed on the unevenness by vapor deposition corresponding to each pixel of a liquid crystal panel.

Figure 9:
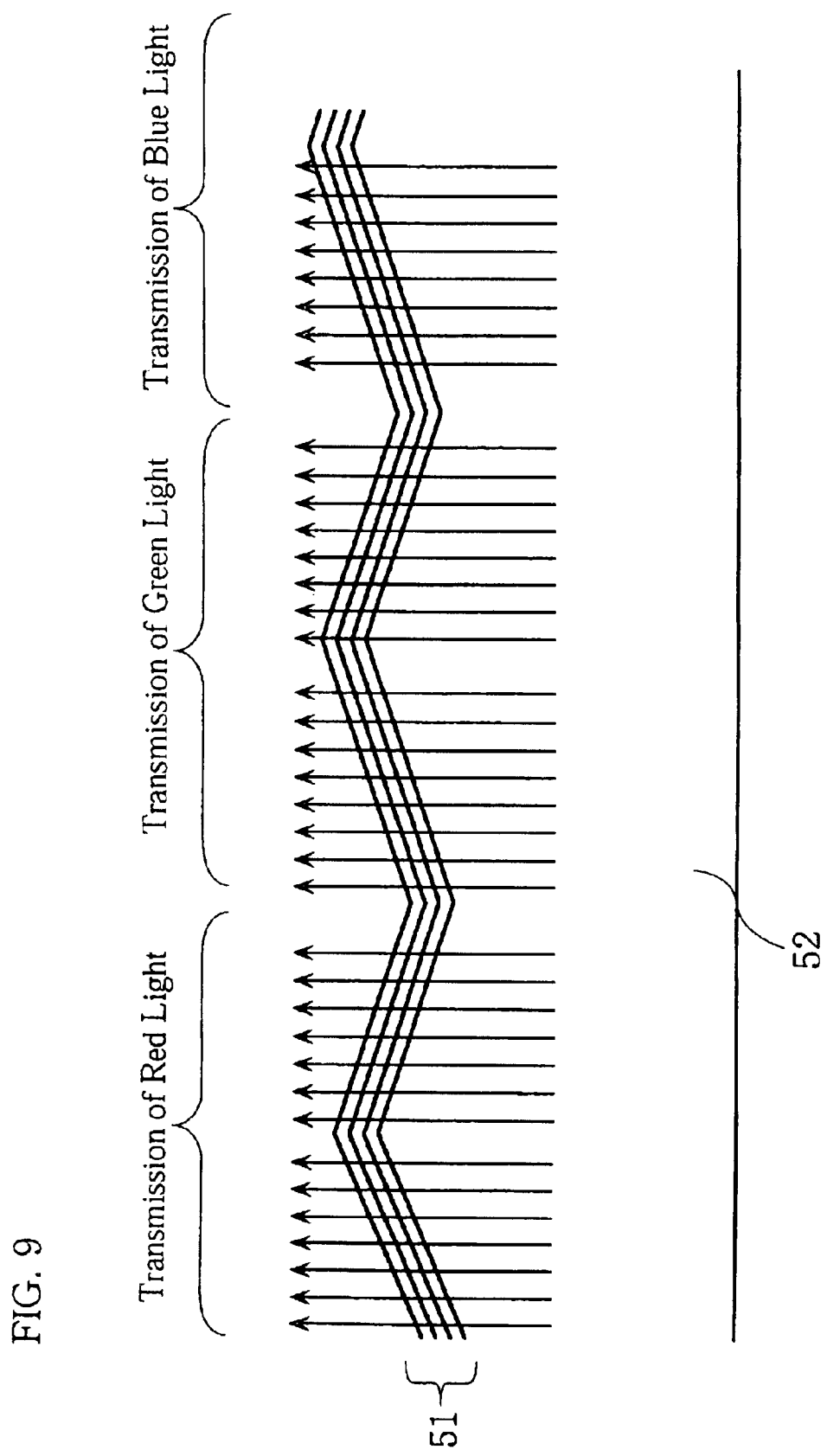
FIG. 9 is a view conceptually showing a structure of an interference filter according to Embodiment 5 in the present invention.

It is a characteristic that the interference filter is formed in each pixel with different directions of inclination with respect to the substrate. FIG. 9 conceptually shows the inclination.

Interference filters are such that colors change depending on the angle from which viewers observe for the previously mentioned reason. The interference filters according to Embodiment 4, however, have a plurality of portions with different angles of inclinations so that colors mix together as a whole even if the colors change with each of the portions, resulting in less change in colors of the interference filters.

As described above, the interference filter formed with a multilayer film is formed by vapor deposition, and additionally the interference filter may be formed by curing a liquid crystal material having a multilayered structure such as cholesteric liquid crystal. Also in this case, it is preferred to form unevenness on the substrate in order to incline layers thereof in a plurality of directions. FIG. 10 shows this interference filter. FIG. 10(*a*) shows a state such that multilayers in a pixel are inclined in four directions. FIG. 10(*b*) conceptually shows a state such that a cholesteric liquid crystal molecule 53 is cured by polymer 54.

In addition to FIG. 10(*b*), variations in the directions in which layers are inclined may be caused by using a polymer dispersed liquid crystal such that capsules of a cured cholesteric liquid crystal are dispersed into a polymer.

The present invention was described hereinbefore based on some embodiments thereof. It is to be noted that the invention is not limited to these embodiments; that is, the invention may, for example, be as described below.

1) As shown in FIG. 11, dichroic display of red and blue is performed by using two kinds of nonabsorption type color filters having characteristics such that reflectance and transmittance abruptly change at a wavelength of approximately 5000 Å.

2) Materials to be used as a substrate are not merely glass and quartz but also resin plate, resin filter, resin film (laminated aluminum) and the like.

Industrial Applicability

As understood hereinbefore, the present invention can realize liquid crystal display devices (display elements, display units) which are usable as both transmissive type devices and reflective type devices, and thereby can realize a minimum loss of light and a bright display.

The liquid crystal display devices enable a display in accordance with battery residual quantity and are excellent in terms of portability.

What is claimed is:

1. A liquid crystal display device for a color display comprising a display panel having a display surface, and is both a transmissive type and a reflective type panel the device comprising:

a back side light source;

a nonabsorption type color filter corresponding to a display color of each pixel on the display surface;

a liquid crystal layer in a cell behind the panel;

reflection means for reflecting light entering from the display panel side of the liquid crystal display device and passing through said liquid crystal layer to exhibit a display when the panel functions as a reflective type panel;

transmission means for transmitting light entering from a side opposite to the display panel side of said liquid crystal layer to exhibit a display when the panel functions as a transmissive type panel; and voltage signal controlling means for applying a first voltage signal to said liquid crystal layer when the panel functions as a transmissive type panel and applying a second voltage signal smaller than the first voltage signal to said liquid crystal layer when the panel functions as a reflective type panel.

2. The liquid crystal display device according to claim 1, wherein said nonabsorption type color filter is an interference color filter for transmitting light with a predetermined wavelength and reflecting light of a complementary color to the color thereof.

3. The liquid crystal display device according to claim 2, wherein said interference color filter is an interference color filter further functioning as a reflection plate when the device is used as a reflective type device.

4. The liquid crystal display device according to claim 1, wherein said nonabsorption type color filter or said interference color filter is a color filter for exhibiting colors of use of the panel, such that a color display of cyan, magenta and yellow is performed when the device functions as a reflective type device and a color display of red, green and blue is performed when the device functions as a transmissive type device.

5. The liquid crystal display device according to claim 1, comprising display inverting means for switching voltage application conditions of a pixel from a voltage application condition under which light passes through said liquid crystal layer to a voltage application condition under which light does not pass through said liquid crystal layer, and switching from a voltage application condition under which light does not pass through said liquid crystal layer to a voltage application condition under which light does pass through said liquid crystal layer.

6. The liquid crystal display device according to claim 5, wherein said device is for operating in a liquid crystal display mode, said liquid crystal display mode being the same in reflective type display and in transmissive type display;

the liquid crystal display mode is normally white or normally black; and said liquid crystal display device comprises display inverting means for switching voltage application conditions of a pixel from a voltage application condition under which light passes through said liquid crystal layer to a voltage application condition under which light does not pass through said liquid crystal layer and switching from a voltage application condition under which light does not pass through, and liquid crystal layer to a voltage application condition under which light does pass through said liquid crystal layer.

7. The liquid crystal display device according to claim 5, wherein the liquid crystal layer comprises a twisted nematic liquid crystal material.

8. The liquid crystal display device according to claim 5, wherein said liquid crystal layer comprises a homeotropic liquid crystal material.

9. The liquid crystal display device according to claim 1, wherein said display device is for operating in a liquid crystal display mode for exhibiting a reflective type display that is opposite to a liquid crystal display mode for exhibiting a transmissive type display.

10. The liquid crystal display device according to claim 9, wherein said liquid crystal layer is in a normally white display mode when the device function as a reflective type device and is in normally black display mode when the device function as a transmissive type device.

11. The liquid crystal display device according to claim 9, wherein said liquid crystal layer is in a normally white display mode when the device function as a transmissive type device and is in a normally black display mode when the device functions as a reflective type device.

12. The liquid crystal display device according to claim 9, wherein the liquid crystal layer comprises a twisted nematic liquid crystal material.

13. The liquid crystal display device according to claim 1, comprising a light transmission inverting structure which when the device functions as a transmissive type device, light does not pass through said structure under a voltage application condition wherein light passes through when the device functions as a reflective type device.

14. The liquid crystal display device according to claim 1, wherein the liquid crystal layer comprises a twisted nematic liquid crystal material.

15. The liquid crystal display device according to claim 14, wherein said twisted nematic liquid crystal material is a 45° twisted nematic liquid crystal with a twist angle of 45°.

16. A The liquid crystal display device according to claim 1, wherein the liquid crystal layer comprises a homeotropic liquid crystal material.

17. The liquid crystal display device according to claim 1, wherein the liquid crystal cell has a thickness of a portion of the liquid crystal layer through which light passes when the panel functions as a transmissive type panel that is larger than a thickness of a portion of the liquid crystal layer through which light passes when the panel functions as a reflective type panel.

18. The liquid crystal display device according to claim 17 for exhibiting a color display, wherein:

said cell is a cell of a color filter having a first thickness when the panel functions as a reflective type panel and a second thickness different from the first thickness when the panel functions as a transmissive type panel so that a thickness of a portion of the liquid crystal layer through which light passes when the panel functions as a transmissive type panel is larger than a thickness of a portion of the liquid crystal layer through which light passes when the panel functions as a reflective type panel.

19. The liquid crystal display device according to claim 17, wherein said cell comprises a resin layer for thinning a thickness of the liquid crystal layer in a portion in the optical path of light when the panel functions as a reflective type panel, so that a thickness of a portion of the liquid crystal layer through which light passes when the panel functions as a transmissive type panel is larger than a thickness of a portion of the liquid crystal layer through which light passes when the panel functions as a reflective type panel.

20. The liquid crystal display device according to claim 19, wherein said resin layer is located on a side of a substrate not having the color filter located thereon.

* * * * *